(12) United States Patent
Lahoda et al.

(10) Patent No.: US 10,515,728 B2
(45) Date of Patent: Dec. 24, 2019

(54) HIGH TEMPERATURE CERAMIC NUCLEAR FUEL SYSTEM FOR LIGHT WATER REACTORS AND LEAD FAST REACTORS

(71) Applicant: WESTINGHOUSE ELECTRIC COMPANY, LLC, Cranberry Township, PA (US)

(72) Inventors: Edward J. Lahoda, Edgewood, PA (US); Frank A. Boylan, Ellwood City, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 163 days.

(21) Appl. No.: 15/706,972

(22) Filed: Sep. 18, 2017

(65) Prior Publication Data

US 2019/0088376 A1 Mar. 21, 2019

(51) Int. Cl.
*G21C 3/62* (2006.01)
*G21C 9/00* (2006.01)
*G21C 3/04* (2006.01)

(52) U.S. Cl.
CPC ............. *G21C 3/626* (2013.01); *G21C 9/00* (2013.01); *G21C 3/045* (2019.01)

(58) Field of Classification Search
CPC ........... G21C 3/626; G21C 9/00; G21C 3/045
See application file for complete search history.

(56) References Cited

U.S. PATENT DOCUMENTS

| 3,427,222 A | 2/1969 | Biancheria et al. | |
| 5,075,075 A | 12/1991 | Kapil | |
| 5,147,598 A * | 9/1992 | Kapil | G21C 3/18 376/417 |
| 5,182,077 A * | 1/1993 | Feinroth | G21C 3/07 376/414 |
| 5,338,576 A | 8/1994 | Hanzawa et al. | |
| 5,391,428 A | 2/1995 | Zender | |
| 6,246,740 B1 | 6/2001 | Maruyama et al. | |
| 6,697,448 B1 | 2/2004 | Korton | |
| 7,139,360 B2 | 11/2006 | Lahoda | |
| 7,961,836 B2 * | 6/2011 | Lahoda | G21C 3/58 376/409 |
| 9,455,053 B2 | 9/2016 | Xu et al. | |
| 2005/0286676 A1 * | 12/2005 | Lahoda | G21C 3/62 376/411 |

(Continued)

FOREIGN PATENT DOCUMENTS

EP 0395920 A2 11/1990

OTHER PUBLICATIONS

Y. Katoh et al.; Continuous SiC fiber, CVI SiC matrix composites for nuclear applications: Properties and irradiation effects; Journal of Nuclear Materials, vol. 448 pp. 448-476 (2014).

(Continued)

*Primary Examiner* — Lily C Garner
(74) *Attorney, Agent, or Firm* — Joseph C. Spadacene; Westinghouse Electric Company LLC

(57) ABSTRACT

An improved, accident tolerant fuel for use in light water and lead fast reactors is described. The fuel includes a ceramic cladding, such as a multi-layered silicon carbide cladding, and fuel pellets formed from $U^{15}N$ and from 100 to 10000 ppm of a boron-containing integral fuel burnable absorber, such as $UB_2$ or $ZrB_2$.

14 Claims, 1 Drawing Sheet

(56) References Cited

U.S. PATENT DOCUMENTS

| | | | | |
|---|---|---|---|---|
| 2006/0039524 A1* | 2/2006 | Feinroth | ............... | C04B 35/806 |
| | | | | 376/409 |
| 2006/0251206 A1* | 11/2006 | Lahoda | ................... | G21C 3/62 |
| | | | | 376/409 |
| 2007/0189952 A1 | 8/2007 | Easler et al. | | |
| 2010/0166133 A1* | 7/2010 | Lahoda | ................... | G21C 3/62 |
| | | | | 376/171 |
| 2014/0192949 A1* | 7/2014 | Feinroth | ............... | C04B 35/565 |
| | | | | 376/451 |
| 2016/0049211 A1* | 2/2016 | Feinroth | ................. | G21C 3/07 |
| | | | | 376/416 |

OTHER PUBLICATIONS

R. Naslain; Two-dimensional SiC/SiC composites processed according to the isobaric-isothermal chemical vapor infiltration gas phase route; Journal of Alloys and Compounds; vol. 188 (1992) pp. 42-48.

J.R. Creighton et al.; Introduction to Chemical Vapor Deposition (CVD) Sandia National Laboratories; 2001 ASM International, Ohio, USA.

D. Kopeliovich; Fabrication of Ceramic Matrix Composites by Chemical Vapor Infiltration (CVI); SubsTech; http://www.substech/dokuwiki/doku.php?id=fabrication_of_ceramic_matrix_composition Aug. 4, 2016.

Chemical Vapor Deposition (CVD) & Chemical Vapor Infiltration (CVI); Thermal Technology LLC; Press Release Sep. 1999; http://www.thermaltechnology.com/show-all.html?id=28.

\* cited by examiner

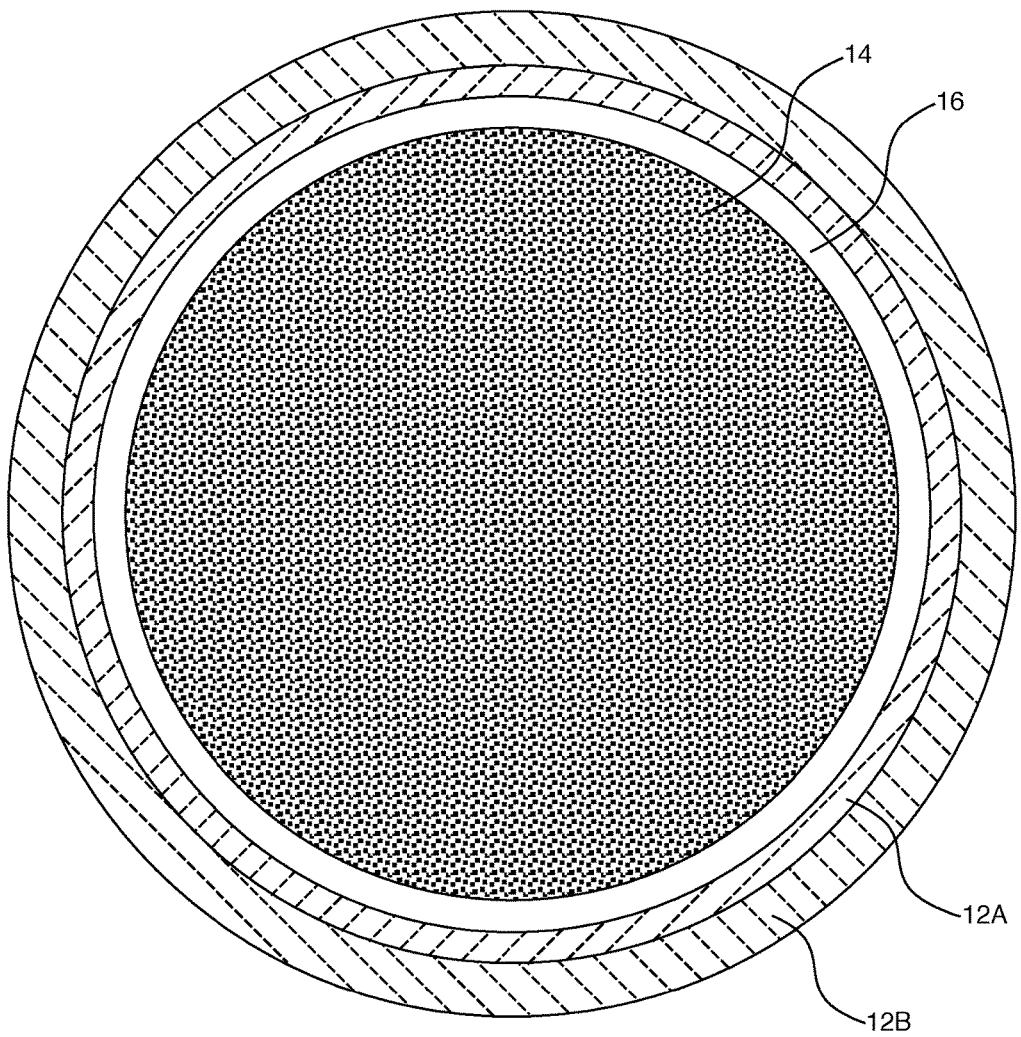

US 10,515,728 B2

HIGH TEMPERATURE CERAMIC NUCLEAR FUEL SYSTEM FOR LIGHT WATER REACTORS AND LEAD FAST REACTORS

STATEMENT REGARDING GOVERNMENT RIGHTS

This invention was made with government support under Contract No. DE-NE0008222 awarded by the Department of Energy. The U.S. Government has certain rights in this invention.

BACKGROUND OF THE INVENTION

1. Field of the Invention

The invention relates to nuclear fuel, and more specifically to an accident tolerant fuel for light water and lead fast reactors.

2. Description of the Prior Art

Fissile material for use as nuclear fuel includes uranium dioxide ($UO_2$), plutonium dioxide ($PuO_2$), uranium nitride (UN), and/or tri-uranium disilicide ($U_3Si_2$). Fuel rods are encased in a cladding that acts as a containment for the fissile material. In a reactor, fuel rods are grouped together in an array which is organized to provide a neutron flux in the core sufficient to support a high rate of nuclear fission and the release of a large amount of energy in the form of heat.

$UO_2$ is currently a widely used nuclear fuel. However, $U_3Si_2$ is the favored fuel material for accident tolerant fuel (ATF) systems. To be accident tolerant, nuclear fuel components are designed for accidents that can result in fuel temperatures of about 1700° C. assuming the addition of a minimal amount of a coolant in the fuel assembly. $U_3Si_2$ is useful when combined with a coated zirconium alloy cladding. Due to the ability of the coated zirconium to expand with the expanding pellet during the useful life of the fissile material, the gap between the pellet and the cladding, which is a major source of thermal heat transfer resistance, can be small, keeping the centerline temperature below the melting point under all transient conditions. The relatively low melting point of $U_3Si_2$, at 1652° C., is therefore not an issue; the very high thermal conductivity of $U_3Si_2$ precludes fuel centerline melt issues during unexpected power transients.

Under severe conditions such as "beyond design basis" accidents; metal cladding can react exothermally with steam at over 1093° C. These zirconium cladding metals protecting the nuclear fuel may lose strength during "a loss of coolant" accident, where reactor temperatures can reach as high as 1204° C., and expand due to internal fission gases within the fuel rod. All this has prompted considering use of ceramic type materials as cladding material.

Ceramic type materials, such as silicon carbide (SiC) monolith, fibers and their combinations are described in U.S. Pat. Nos. 6,246,740, 5,391,428, 5,338,576; and 5,182,077 and U.S. Patent Publications Nos. 2006/0039524 A1 and 2007/0189952 A1; and tangentially, U.S. Pat. No. 6,697,448, as complete or partial substitutes for metal fuel rods. See also U.S. Pat. No. 9,455,053.

However, ceramic claddings such as SiC cannot expand under internal stress from the fuel. A larger gap must be left between the fuel pellet and the cladding to preclude pellet-cladding mechanical interactions. This larger gap makes $U_3Si_2$ fuel vulnerable to centerline melt during unexpected power transients even with its very high thermal conductivity.

For the same reason, $UO_2$ fuel is not suitable for use with SiC cladding because $UO_2$'s very low thermal conductivity makes it prone to centerline melt during high power transients even with its very high melting point (2865° C.).

It is known that UN fuel has a high density (14.4 gm/cm$^3$), very high thermal conductivity (up to 10x$UO_2$), and very high melting point (2800° C.). Its use as a nuclear fuel has been confined to gas, metal and salt cooled reactors because exposure to water coolant used in light water reactors would result in very energetic reactions which could endanger the fuel rods in which it is contained as well as adjacent rods in the array, thus leading to a cascading failure. In addition, use of UN as a fuel is hampered by the fact that the N15 isotope is required for economical use. The N14 isotope, which makes up more than 99% of naturally occurring nitrogen, absorbs neutrons to such an extent as to make the use of $U^{14}N$ economically untenable. The cost of isolating the N15 isotope, however, is cost prohibitive. Current isolation processes cost tens of thousands of dollars (U.S.) per kg, a cost that is economically unsupportable in any nuclear fuel use.

In the operation of a nuclear reactor, it is desirable to prolong the life of the reactor core as long as feasible in order to better utilize the uranium fuel and thereby reduce fuel costs. One way of doing this is to use a burnable absorber material which has a high neutron-absorption cross-section to absorb excess neutrons during the initial period of operation when reactivity of the fissile material is very high. In time, the neutron-absorption cross-section of burnable absorbers decreases without substantially affecting the reactivity of the fuel during the later period of operation when neutron availability is less. Thus, the burnable absorber or poison compensates for the excessive neutron production of the fuel occurring during the early period of operation but progressively burns up and captures less neutrons during the later period of operation, thereby extending the life of the fuel and maintaining the reactivity relatively constant over its lifetime. See for example, EP 0395920 A2. Burnable absorbers have been incorporated into some fuel rods to minimize the amount of mechanical control required.

Examples of burnable absorbers include boron-containing compounds, such as boron carbide, boron nitride, and zirconium boride or zirconium diboride. These materials have been successfully applied in connection with integral fuel burnable absorber (IFBA) rods used in pressurized water reactors (PWR) fuel assemblies.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, and abstract as a whole.

An improved accident tolerant fuel combination is described herein. The fuel combination includes in various aspects, a multi-layered cladding formed from a ceramic material, such as SiC, fuel pellets formed from $U^{15}N$, and an integral fuel burnable absorber intermixed with the fuel formed from a boron-containing material, such as $UB_2$ or $ZrB_2$.

The fuel combination described herein takes advantage of the strong points of each of the components $U^{15}N$ fuel, ceramic cladding, and boron-containing integral fuel burnable absorber. For example, the fuel benefits from the relatively high melting point, high thermal conductivity and high density of $U^{15}N$, and the high decomposition temperature and hardness of the ceramics, such as SiC cladding, and the high density and high melting point of the boron content of the burnable absorber to produce a fuel which optimizes performance during normal operation as well as providing the most accident tolerance of any known nuclear fuel component combination.

In various aspects, the accident tolerant fuel may be used in light water and lead fast reactors. The accident tolerant fuel may comprise a composite ceramic cladding, and fuel pellets comprising $U^{15}N$ and a boron-containing integral fuel burnable absorber. The absorber may be selected from $UB_2$ and $ZrB_2$. The B10 isotope content in the $UB_2$ integral fuel burnable absorber, for example, may be between 19% and 80%. The $UB_2$ content in the $U^{15}N$ pellet is between 100 ppm and 10000 ppm.

The ceramic cladding may be SiC. The SiC cladding may, in various aspects, be comprised of at least one composite SiC layer and one monolith SiC layer.

The SiC cladding in various aspects has a total wall thickness between 0.4 mm and 1.4 mm.

The $U^{15}N$ fuel may, in certain aspects, have a density between 80% and 99% of theoretical density. The N15 isotope content in the $U^{15}N$ fuel pellet may be between 75% and 99.9%. The $U^{15}N$ fuel may have a UN purity greater than 90%.

BRIEF DESCRIPTION OF THE DRAWINGS

The characteristics and advantages of the present disclosure may be better understood by reference to the accompanying FIGURE.

A cross-section of an exemplary fuel rod, including the cladding and fuel pellet is shown in the accompanying FIGURE.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

A "Ceramic Composite" as used herein may include structures such as SiC or $Al_2O_3$. Ceramic composites are most preferably comprised of multiple layers of ceramic materials, including for example, dense monolithic SiC, and SiC—SiC composite. In one preferred version of ceramic cladding, the inner layer of the cladding consists of dense monolithic SiC, which has extremely low permeability. In various aspects, the cladding may have up to three layers of monolithic SiC to provide redundant containment of fission products. Each layer may, in certain aspects, be separated by an intermediate layer made of pyrocarbon, that is a material similar to graphite, but with some covalent bonding between its graphene sheets as a result of imperfections in its production. The next layer of the cladding structure may be a ceramic composite, such as a SiC—SiC composite layer. A SiC—SiC composite is in tension, keeping the monolith layer in compression to counter the radial stress gradient across the clad during periods of high heat flux. Additional layers may be added to provide additional features such as increased corrosion resistance, decreased pressure drop, increased heat transfer or other attributes.

The accident tolerant fuel described herein includes in various aspects, a cladding formed from a ceramic material, fuel pellets formed from $U^{15}N$, and, an integral fuel burnable absorber formed from a boron-containing material, such as $UB_2$ or $ZrB_2$.

The improved fuel is suitable for use in light water reactors and lead fast reactors. Light water reactors (LWR) are reactors that use ordinary water as the coolant, including boiling water reactors (BWRs) and pressurized water reactors (PWRs), the most common types used in the United States. Fast reactors fall in a category of nuclear reactor in which the fission chain reaction is sustained by fast neutrons, as opposed to thermal, or slow, neutrons like in traditional nuclear plants. Lead-cooled fast reactors feature a fast neutron spectrum, molten lead or lead-bismuth eutectic coolant. Options include a range of plant ratings, including a number of 50 to 150 MWe (megawatts electric) units featuring long-life, pre-manufactured cores. Use of lead as coolant, with a boiling point exceeding 1700° C., allows for high temperature operation at atmospheric pressure without boiling concerns, which benefits thermodynamic efficiency, reduces capital cost and facilitates achieving inherent safety compared to pressurized systems. Because lead coolant does not react with air and water and has limited activation under neutron irradiation, lead fast reactor technology eliminates the need and associated expense of extra components and redundant safety systems required by other technologies for protection against coolant leakages.

Referring to the accompanying FIGURE, the improved accident tolerant fuel combines the strengths of each of the ceramic cladding 12, $U^{15}N$ fuel pellets 14, and a boron-containing material, such as $UB_2$ or a $ZrB_2$ as an integral fuel burnable absorber. A gap 16 separates the surface of the fuel pellets 14 from the interior of the cladding 12. Cladding 12 may, in various aspects, comprise multiple layers, illustrated as layers 12A and 12B in the FIGURE.

In various aspects, the proposed accident tolerant fuel combination utilizes SiC as the ceramic cladding material to provide very low leakage failures and resistance to very high temperatures (~2545° C.) during beyond design basis accidents. This very low leakage failure rate allows the use of the water sensitive $U^{15}N$ fuel and a boron-containing burnable absorber.

$U^{15}N$ provides the high density for excellent economics of operation and the high thermal conductivity and high melting temperature required to provide a large initial gap 16, from about 0.01 to 0.3 mm, between the $U^{15}N$ pellet 14 and the SiC cladding 12 to prevent pellet-cladding mechanical interaction and centerline melt during high power excursions.

$UB_2$ has a high density (12.7 gm/cm$^3$) and high melting point (2430° C.) but cannot be used for a fuel due to its water reactivity. Boron naturally occurs as stable isotopes B10 and B11, with B11 making up about 80% and B10 making up about 20% of natural boron. The B10 isotope cannot be used as a fuel because the B10 isotope has a very large neutron cross-section that would make it impossible to start a reactor if there were a large quantity of $UB_2$ in the core. Boron has been used as an integral fuel burnable absorber when sprayed in very small quantities on the outside of current $UO_2$ fuel pellets in the form of $ZrB_2$. $ZrB_2$ has to be sprayed on the outside of the $UO_2$ pellets because it, like $UB_2$, is known to interact with the oxygen in the $UO_2$ to form BOx during the sintering process, driving off the boron contained within the pellet.

The boron-containing integral burnable absorber described herein does not interact with $U^{15}N$. Therefore, it can be added directly to the $U^{15}N$ powder before pelleting of the U15 pellets and sintered at a very large cost savings and an increase in quality due to the uniformity achieved by this approach compared to the spray methods heretofore used. Since more $UB_2$ and $ZrB_2$ can be added to the pellet, enrichment of the B10 isotope content that had been necessary in order to minimize the amount of $UB_2$ or $ZrB_2$ used is not required, resulting in a further significant cost saving. The boron-containing integral burnable absorber used in the fuel system described herein may have a B10 isotope content at 19% to 80% of the boron. Since $UB_2$ also has a very high density, the higher addition rates does not significantly affect the total uranium density of the $U^{15}N$ pellet.

In the fuel system described herein, the boron-containing components may be added to the fissile material powder forming the fuel pellet, thereby providing a tremendous cost saving compared to spraying boron-compounds as a very thin, uniform coating on the outer surface of all of the pellets.

This fuel approach utilizes the best features of $U^{15}N$, SiC and $UB_2$ or $ZrB_2$ to overcome the inherent weakness of each. So for instance, it is not feasible to use UN fuels and $UB_2$ integral fuel burnable absorbers in current metal claddings because of the comparatively high leak rate of the cladding that would result in unacceptable reactions with coolant resulting in large scale fuel failures. The use of $U^{15}N$ allows the use, for example, of SiC cladding by providing a fuel with large thermal conductivity and high melting point that can withstand high power transients without centerline melt. Finally, the use of $UB_2$ or $ZrB_2$ provides a means of controlling the high initial nuclear reactivity of the $U^{15}N$ due to its high density by providing an economical means of adding enough boron to the $U^{15}N$ powder before pelleting.

The fuel system described herein includes a ceramic material, such as SiC, as the cladding. The ceramic cladding 12 may be made up of at least one composite layer (12A or 12B) and one monolith layer (12B or 12A). The monolith layer in various aspects is fabricated as a single structure. The monolith layer adds hermeticity to the cladding. The conventional metallic claddings have a leakage rate of about 1 to 2 ppm, most of which is due to grid-to-rod fretting. Although SiC is very hard and cannot withstand internal tensile stresses due to pellet swelling, it can take very high compressive stresses and is very resistant to erosion and wear due to in-reactor wear from other components, such as grid-to-rod fretting, and debris in the coolant. It therefore has a much higher resistance to leakage during use than do metal claddings. The leakage rate of SiC is expected to be 10 to 100 times better than that of conventional metal claddings.

In various aspects, the ceramic monolith layer 12A may be surrounded by a ceramic composite layer 12B, such as a layer of fibers wrapped around the monolith layer. In various aspects, the ceramic monolith layer is a SiC layer and the fibers are SiC fibers. Alternatively, or additionally, the SiC monolith may have a SiC composite layer added to its surface by chemical vapor deposition.

The SiC composite layer, in various aspects, may be in the form of wrappings or braidings of SiC fibers over a single SiC monolith tube to form the fuel rod cladding. In certain aspects, the SiC fiber wrappings or braids may then be infiltrated with SiC particles to fill voids in and between the fibers using chemical vapor infiltration (CVI). Infiltration of the windings may be followed by coating the infiltrated fibers to form a barrier coat using a higher temperature chemical vapor deposition (CVD). To avoid excess handling and to reduce costs and manufacturing time, the two processes, CVI and CVD, are usually carried out sequentially in a single vessel or apparatus.

In certain aspects, the SiC composite layer may be comprised of the features and formed in a manner similar to that described in co-pending U.S. patent application Ser. No. 15/187,985, incorporated by reference herein, in the absence, however, of the zirconium cladding tube described in that application. In certain aspects, the SiC cladding may be made in accordance with the method described in co-pending U.S. patent application Ser. No. 15/245,933 filed Aug. 24, 2016, incorporated by reference herein.

To begin the process, a form of a desired shape or the SiC monolith layer may be wrapped with ceramic fiber tows by braiding or by winding the fiber tows about the outer surface of the form or monolith. Braiding and winding techniques are well known to those skilled in this area of endeavor. The fiber, in various aspects, may be a SiC ceramic with low oxygen and a near stoichiometric ratio of Si/C. The SiC composite formed on the outside of the tube may comprise continuous SiC fiber-reinforced SiC matrix composites, as disclosed in U.S. Patent Application Publication 2015/0078505, incorporated by reference herein, or Y. Katoh et al., "Continuous SiC fiber, CVI SiC matrix composites for nuclear applications: Properties and irradiation effects," *Journal of Nuclear Materials*, vol. 448, pp. 448-476 (2014). The type of SiC fibers that may be used in the method described herein may, for example, be either Hi-Nicalon™ Type S fibers (manufactured by Nippon Carbon, Tokyo, Japan) or Tyranno™ SA3 fibers (manufactured by Ube Industry, Ube, Japan) listed in Table 1 of Y. Katoh et al., *Journal of Nuclear Materials*, vol. 448 at 450.

In various aspects, an exemplary method of manufacture may produce multiple layers of SiC materials, including dense monolithic SiC, SiC—SiC composite, SiC fiber reinforced composites, such as one or more, preferably two or three, layers of high purity beta or alpha phase stoichiometric SiC covered by a central layer of continuous beta phase stoichiometric SiC fibers infiltrated with beta phase SiC and an outer protective layer of fine grained, highly crystalline beta phase SiC. In various aspects, the finished product may include a SiC continuous fiber-reinforced, SiC matrix composites (SiC/SiC composites) consisting of near stoichiometric SiC fibers, stoichiometric and fully crystalline SiC matrices, and pyrocarbon or multilayered pyrocarbon/SiC interphase between the fiber and the matrix.

The wrappings, whether by braiding or winding, may have a thickness comparable to the thickness of the ceramic monolith layer being wrapped. In exemplary embodiments, the ceramic cladding comprised of the monolith layer and the ceramic composite layer may be from 0.4 to 1.4 mm thick. In certain embodiments, the composite layer may be wrapped to a thickness of about 0.1 mm to 1.3 mm and preferably wrapped to a thickness of about 0.2 mm to 1 mm. The wrappings about the monolith layer generally have a density of about 45-55%, so are inherently porous, forming voids or spaces between the interstices of the wrappings.

After the fibers are wrapped, the interstices of the ceramic matrix thus formed may be filled, for example, by infiltration and coatings steps, with a ceramic powder, such as a SiC nano-particles, or nano-powder, in dry form. Alternatively, the interstices of the SiC fiber matrix may be infiltrated with a slurry containing SiC nano-particles.

CVI provides a process for depositing chemical vapors of a desired material or a precursor to a desired material, or particles of a desired material or a precursor thereof that are carried by a vapor, onto the internal surfaces of a porous preformed structure, in the present case, the fiber wrappings. Reactants are introduced into the voids of the porous preformed fiber wrappings by diffusion or by force using convection. As precursor gases diffuse into the fiber matrix, there is a continuous decomposition of the precursor gases taking place on the fibers surfaces to form the deposited infiltrate. As the infiltration proceeds, the infiltrate thickens, filling the voids and bonding to the fiber wrappings. One commercially useful CVI processes uses a reduced pressure of about 1 to 10 kPa for deposition of the infiltrate by diffusion. An advantage to processing under a lower pressure is to allow the gases to slowly infiltrate the fiber voids before deposition of the SiC infiltrate takes place. Another useful CVI process is a forced flow thermal gradient technique that is significantly (hours versus days) more rapid than the diffusion processes. Those skilled in the art will recognize that the temperature and pressure may be adjusted to reach a desired rate of infiltration, density of the infiltrate, and a desired overall processing time.

In various aspects, a SiC monolith layer 12B may be deposited on ceramic fiber wrappings 12A by chemical vapor deposition (CVD), or a third layer (not shown) may be deposited on ceramic composite fiber wrappings 12B, having a SiC monolith layer 12A interior to the composite layer. In a typical chemical vapor deposition process, the substrate is exposed to one or more reactive precursors, which react and/or decompose on the substrate surface to produce the desired deposit. Frequently, by-products are also produced, which are removed by gas flow through a reaction chamber.

CVD has been in wide commercial use to deposit a wide range of materials. CVD, in general, involves flowing a precursor gas or gases into a chamber containing the heated object to be coated. In various aspects of the method described herein, the object is the highest density of infiltrated fiber wrappings resulting from the infiltration process described above. The fiber wrappings may have been separated from the removable form prior to the coating step, or may be wrapped about the monolith layer. Chemical reactions on or near the surface of the heated object create a film on the surface, coating the object. The precursor gas may be the same gas used in the CVI step if used, i.e., methyltrichlorosilane carried in hydrogen or other precursors of SiC.

The fuel used in the combination described herein is $U^{15}N$, containing primarily the N15 isotope, with the balance being N14. Nitrogen-15 may be produced by separation of the naturally occurring element. Nitric oxide has been used for separating Nitrogen-15. Enrichment is available to 99.9 atom %.

The $U^{15}N$ may have a density of between 80% and 99% of theoretical density. The N15 isotope may be present in the $U^{15}N$ fuel at a 75% to 99.9% content of N15. The $U^{15}N$ fuel may have a UN purity level of greater than 90%. The balance may be comprised of $UO_2$, UC, and other traces of residual oxides and carbon compounds remaining from the processes for making the fuel material. Uranium nitride may also decompose as it is used, resulting in the gradual increase of decomposition compounds.

An exemplary technique for generating uranium nitride is the carbothermic reduction of uranium oxide ($UO_2$) in a 2 step method illustrated below.

$3UO_2+6C\rightarrow2UC+UO_2+4CO$ (in argon at greater than 1450° C. for 10 to 20 hours) $4UC+2UO_2+3^{15}N_2\rightarrow6U^{15}N+4CO$.

Sol-gel methods and arc melting of pure uranium under nitrogen atmosphere can also be used.

The combination of a boron burnable absorber like $UB_2$ or $ZrB_2$, and $U^{15}N$ as the fissile material works because of the non-reactive stability of the combination. A conventional fuel like $UO_2$ has a variable stoichiometry in practice. If $UB_2$ or $ZrB_2$ is mixed with $UO_2$, the boron reacts with excess oxygen to form a volatile compound that is released when the pellet is sintered. $U^{15}N$ is a line compound, having no variability in its stoichiometry. $U^{15}N$ therefore can be mixed with $UB_2$ or $ZrB_2$ to yield a stable mixture.

The fuel pellets may be formed by known methods of manufacturing pellets in other commercial contexts. For example, the $U^{15}N$ fuel in powder or particulate form, may be formed into a pellet by first homogenizing the particles to ensure relative uniformity in terms of particle size distribution and surface area. The integral fuel burnable absorber, $UB_2$ for example, also in powder or particulate form, and in certain aspects, other additives, such as lubricants and pore-forming agents, would be added. The $UB_2$ content in the $U^{15}N$ pellet may be between 100 ppm and 10000 ppm, and in various aspects, may be about 1000 ppm.

The $U^{15}N$ and $UB_2$ particles may be formed into pellets by compressing the mixture of particles in suitable commercially available mechanical or hydraulic presses to achieve the desired "green" density and strength.

A basic press may incorporate a die platen with single action capability while the most complex styles have multiple moving platens to form "multi-level" parts. Presses are available in a wide range of tonnage capability. The tonnage required to press powder into the desired compact pellet shape is determined by multiplying the projected surface area of the part by a load factor determined by the compressibility characteristics of the powder.

To begin the process, the mixture of particles is filled into a die. The rate of die filling is based largely on the flowability of the particles.

Once the die is filled, a punch moves towards the particles. The punch applies pressure to the particles, compacting them to the geometry of the die. In certain pelleting processes, the particles may be fed into a die and pressed biaxially into cylindrical pellets using a load of several hundred MPa.

Following compression, the pellets are sintered by heating in a furnace at temperatures varying with the material being sintered under a controlled atmosphere, usually comprised of argon. Sintering is a thermal process that consolidates the green pellets by converting the mechanical bonds of the particles formed during compression into stronger bonds and greatly strengthened pellets. The compressed and sintered pellets are then cooled and machined to the desired dimensions. Exemplary pellets may be about one centimeter, or slightly less, in diameter, and one centimeter, or slightly more, in length.

The accident tolerant nuclear fuel combination described herein provides a ceramic cladding comprised of at least a monolith layer and a composite layer that houses a stack of fuel pellets formed from $U^{15}N$ mixed with from 100 to 10000 ppm of a boron-containing burnable absorber.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. An accident tolerant fuel combination for light water and lead fast reactors comprising:
   a multi-layered ceramic cladding; and
   fuel in pellet form positioned within the cladding such that a gap sized to prevent pellet-cladding mechanical interaction and centerline melt during high power excursions is defined between the cladding and the pellet, the fuel comprising $U^{15}N$ intermixed with a boron-containing integral fuel burnable absorber selected from the group consisting of $UB_2$ and $ZrB_2$ and having a 1310 content at 19% to 80% of the boron.

2. The fuel combination recited in claim 1 wherein the ceramic cladding comprises at least one monolith layer and at least one composite layer.

3. The fuel combination recited in claim 2 wherein the ceramic cladding is made of a SiC monolith layer and a SiC ceramic composite layer.

4. The fuel combination recited in claim 1 wherein the ceramic cladding has a total wall thickness between 0.4 mm and 1.4 mm.

5. The fuel combination recited in claim 1 wherein the $U^{15}N$ fuel has a N15 isotope content between 75% and 99.9%.

6. The fuel combination recited in claim 1 wherein the $U^{15}N$ fuel has a UN purity greater than 90%.

7. The fuel combination recited in claim 1 wherein the boron-containing integral fuel burnable absorber is $UB_2$.

8. The fuel combination recited in claim 1 wherein the boron-containing integral fuel burnable absorber content in the $U^{15}N$ pellet is between 100 ppm and 10000 ppm.

9. The fuel combination recited in claim 1 wherein the $U^{15}N$ fuel has a density between 80% and 99% of theoretical density.

10. An accident tolerant nuclear fuel combination comprising:
    a ceramic cladding comprised of at least a monolith layer and a composite layer;
    a plurality of fuel pellets stacked in the cladding such that a gap sized to prevent pellet-cladding mechanical interaction and centerline melt during high power excursions is defined between the cladding and the fuel pellets, the fuel pellets formed from $U^{15}N$ mixed with from 100 to 10000 ppm of a boron-containing integral fuel burnable absorber selected from the group consisting of $UB_2$ and $ZrB_2$, having a B10 content at 19% to 80% of the boron.

11. The nuclear fuel combination recited in claim 10 wherein the ceramic cladding is formed from a SiC monolith wrapped in SiC composite fibers.

12. The nuclear fuel combination recited in claim 10 wherein the $U^{15}N$ fuel has a N15 isotope content between 75% and 99.9% and a UN purity greater than 90%.

13. The fuel combination recited in claim 1 wherein the gap is between about 0.01 to 0.3 mm.

14. The nuclear fuel combination recited in claim 10 wherein the gap is between about 0.01 to 0.3 mm.

* * * * *